(12) United States Patent
Koeppendoerfer et al.

(10) Patent No.: US 10,488,273 B2
(45) Date of Patent: Nov. 26, 2019

(54) MEASURING ARRANGEMENT AND TEMPERATURE-MEASURING METHOD, AND SENSOR CABLE FOR SUCH A MEASURING ARRANGEMENT

(71) Applicant: LEONI KABEL HOLDING GMBH, Nuremberg (DE)

(72) Inventors: Erwin Koeppendoerfer, Schwabach (DE); Markus Schill, Munich (DE)

(73) Assignee: LEONI Kabel Holding GmbH, Nuremberg (DE)

( * ) Notice: Subject to any disclaimer, the term of this patent is extended or adjusted under 35 U.S.C. 154(b) by 292 days.

(21) Appl. No.: 15/187,042

(22) Filed: Jun. 20, 2016

(65) Prior Publication Data

US 2016/0290876 A1 Oct. 6, 2016

Related U.S. Application Data

(63) Continuation of application No. PCT/EP2014/078066, filed on Dec. 16, 2014.

(30) Foreign Application Priority Data

Dec. 20, 2013 (DE) ........................ 10 2013 227 051

(51) Int. Cl.
*G01K 7/16* (2006.01)
*G01K 7/34* (2006.01)
(Continued)

(52) U.S. Cl.
CPC ............. *G01K 7/343* (2013.01); *G01K 7/16* (2013.01); *H01B 1/026* (2013.01); *H01B 7/324* (2013.01)

(58) Field of Classification Search
CPC . G01K 1/08; G01K 11/32; G01K 7/16; G01K 3/06; G01K 7/00; G01K 13/00;
(Continued)

(56) References Cited

U.S. PATENT DOCUMENTS 4,372,693 A 2/1983 Lutz
4,412,090 A * 10/1983 Kawate .................... G01K 1/08
136/230

(Continued)

FOREIGN PATENT DOCUMENTS

CN 201226019 Y * 4/2009
CN 201251829 Y 6/2009
(Continued)

*Primary Examiner* — Gail Kaplan Verbitsky
(74) *Attorney, Agent, or Firm* — Laurence A. Greenberg; Werner H. Stemer; Ralph E. Locher

(57) ABSTRACT

A temperature measurement is performed using a sensor cable. The measuring arrangement has a first signal conductor, a feed unit for feeding a measurement signal into the signal conductor, and an analyzing unit which ascertains and analyzes a change in the signal transit time of the measurement signal as a result of a temperature-induced change in a first temperature-dependent dielectric constant and is configured to derive a temperature signal from the ascertained signal transit time. The first signal conductor together with a second signal conductor forms the sensor cable, and each of the two signal conductors is surrounded by an insulation which is made of a first material that has a first dielectric constant in the first signal conductor and which is made of a second material that is different from the first material and has a second dielectric constant in the case of the second signal conductor.

15 Claims, 4 Drawing Sheets

(51) Int. Cl.
*H01B 7/32* (2006.01)
*H01B 1/02* (2006.01)

(58) Field of Classification Search
CPC .. G01K 2007/166; G01K 7/343; G01K 7/427; G01K 11/24; G01K 2217/00; G01K 7/08
USPC ......... 374/141, 137, 110, 102, 112, 29, 184, 374/183
See application file for complete search history.

(56) References Cited

U.S. PATENT DOCUMENTS

| | | | | |
|---|---|---|---|---|
| 5,521,333 | A * | 5/1996 | Kobayashi | H01B 11/005 174/110 F |
| 5,793,293 | A * | 8/1998 | Melamud | G01K 3/005 340/511 |
| RE36,307 | E * | 9/1999 | Marin | H01B 7/189 174/102 SC |
| 6,573,456 | B2 * | 6/2003 | Spruell | H01B 7/184 174/110 R |
| 6,768,060 | B2 * | 7/2004 | Belli | H01B 7/185 174/110 F |
| 7,271,343 | B2 * | 9/2007 | Clark | H01B 11/02 174/113 R |
| 7,375,602 | B2 * | 5/2008 | Flake | G01R 31/088 324/160 |
| 2001/0032734 | A1 * | 10/2001 | Madry | H01B 7/288 174/121 R |
| 2005/0056454 | A1 * | 3/2005 | Clark | H01B 11/02 174/113 R |
| 2005/0109753 | A1 * | 5/2005 | Jones | H05B 3/56 219/213 |
| 2009/0059998 | A1 * | 3/2009 | Hou | G01K 3/06 374/185 |
| 2010/0127832 | A1 * | 5/2010 | Pischek | H04Q 9/00 340/10.1 |
| 2010/0254420 | A1 * | 10/2010 | Corzine | H04B 10/506 372/38.04 |
| 2011/0120745 | A1 * | 5/2011 | Booth | G01V 1/201 174/113 R |
| 2013/0341067 | A1 * | 12/2013 | Kenny | H01B 11/04 174/116 |
| 2014/0060891 | A1 * | 3/2014 | Deshaies | H02G 3/30 174/163 R |
| 2014/0287175 | A1 * | 9/2014 | Krawiec | H01B 3/46 428/36.4 |
| 2015/0179306 | A1 * | 6/2015 | Gareis | H01B 7/30 174/102 R |
| 2016/0351304 | A1 * | 12/2016 | Schmidt | F16L 59/141 |
| 2016/0365174 | A1 * | 12/2016 | Gareis | H01B 11/1804 |
| 2018/0203323 | A1 * | 7/2018 | Goss | G01K 3/00 |

FOREIGN PATENT DOCUMENTS

| | | | | |
|---|---|---|---|---|
| CN | 201489634 U | | 5/2010 | |
| CN | 201489635 U | | 5/2010 | |
| CN | 102394138 A | * | 3/2012 | |
| CN | 203351762 U | * | 12/2013 | |
| CN | 204650702 U | * | 9/2015 | |
| DE | 1038140 B | | 9/1958 | |
| DE | 1134532 A1 | | 8/1962 | |
| DE | 2061812 A1 | | 6/1972 | |
| DE | 102006059390 A1 | | 6/2008 | |
| DE | 102008017426 A1 | * | 10/2009 | ............. G01K 11/22 |
| EP | 0288952 A2 | * | 11/1988 | ................ G01P 3/66 |
| GB | 764657 A | | 12/1956 | |
| JP | 59084129 A | * | 5/1984 | ............ G01K 11/24 |
| WO | WO 9416451 A1 | * | 7/1994 | ............ H01B 11/20 |
| WO | 2008102104 A1 | | 8/2008 | |
| WO | 2009046751 A1 | | 4/2009 | |

* cited by examiner

MEASURING ARRANGEMENT AND TEMPERATURE-MEASURING METHOD, AND SENSOR CABLE FOR SUCH A MEASURING ARRANGEMENT

CROSS-REFERENCE TO RELATED APPLICATION

This is a continuation application, under 35 U.S.C. § 120, of copending international application No. PCT/EP2014/078066, filed Dec. 16, 2014, which designated the United States; this application also claims the priority, under 35 U.S.C. § 119, of German patent application No. DE 10 2013 227 051.8, filed Dec. 20, 2013; the prior applications are herewith incorporated by reference in their entireties.

BACKGROUND OF THE INVENTION

Field of the Invention

The invention relates to a measuring arrangement for temperature measurement with a first signal line, with an injection unit for injecting a measurement signal into the signal line, and with an evaluation unit for the ascertainment and evaluation of a change in a signal transit time of the measurement signal as a result of a change in a first temperature-dependent dielectric coefficient resulting from temperature, and for the derivation of a temperature signal from the signal transit time that has been ascertained. The invention further relates to a method for temperature measurement with the aid of such a measuring arrangement, along with a sensor cable and an evaluation unit for such a measuring arrangement.

A corresponding method for determining the temperature distribution along a conductor is described in international patent disclosure WO 2009/046751 A1, in which a pulse is coupled into the conductor by a coupling-in unit, and a response pulse caused by the pulse is measured by a measuring unit, by which the temperature distribution is in turn determined. The conductor here is an electrical conductor, and the response pulse that is caused depends, amongst other things, on local changes in the dielectric coefficient.

A measuring arrangement with the aid of a sensor cable is to be found in published, non-prosecuted German patent application DE 10 2006 059 390 A1. In this, two signal lines, laid in parallel, are provided, and are joined together at a large number of points along the length of the sensor cable through a sensor device at each. The individual sensor devices here define local temperature measuring points, and are configured as wafers with a temperature-dependent electrical conductivity. The two signal lines can also here consist of different materials with different thermoelectric coefficients. The fact that as a result of a local temperature increase, the electrical resistance of the special wafer, and therefore also an impedance for a measurement signal, changes, is used amongst other things to locate a local increase in temperature. As a result of the local change in the impedance of the wafer, a signal component is reflected as an electrical pulse. The wafer with changed resistance and changed temperature can then be localized through the signal transit time between the transmission of the pulse and the reception of the reflected component.

The sensor cable to be found in published, non-prosecuted German patent application DE 10 2006 059 390 A1 is comparatively complex and expensive as a result of the large number of individual wafers required.

An apparatus for the detection of temperature variations is described in U.S. Pat. No. 4,372,693, with a first conductor, with a second conductor which comprises a plurality of thermostats connected in series, and with a dielectric that is arranged spatially between the two conductors. Wherein the two conductors, together with the dielectric, exhibit a certain capacitance, and which are connectable to a capacitance measuring instrument.

An electric cable is, further, described in German patent DE 1 038 140, with equipment for monitoring the operating temperature, wherein the cable cores are connected to an electric signaling system and have an insulation which changes its electrical properties when the temperature changes. The cables are provided with an absorbent insulation and are surrounded on all sides by an impregnating agent whose dielectric coefficient changes at a certain cable temperature to the degree that the change can be used to display and measure the location of the site of the temperature change in the cable.

SUMMARY OF THE INVENTION

On this basis the invention addresses the task of disclosing a measuring arrangement for temperature measurement, a method for temperature measurement, as well as a sensor cable and an evaluation unit for such a measuring arrangement, wherein a reliable temperature measurement is enabled with the aid of an easily designed sensor cable. A method for protecting a cable with the aid of the measuring arrangement or of the sensor cable is also to be disclosed.

The measuring arrangement for temperature measurement contains a sensor cable with a first signal line, into which, when operating, a measurement signal is injected with the help of an injection site. Preferably two signal lines are arranged, into which the measurement signal is fed symmetrically. Further, the measuring arrangement contains an evaluation unit for evaluation of the injected measurement signal after it has passed through at least a partial segment of the sensor cable. According to the invention the first signal line is surrounded by an insulation as a dielectric manufactured of a first material with a first temperature-dependent dielectric coefficient, and the evaluation unit is designed to ascertain and evaluate a change in a signal transit time of the measurement signal as a result of a change in the dielectric coefficient resulting from temperature, and for the derivation of a temperature signal from the signal transit time that has been ascertained.

This measuring arrangement exploits for temperature measurement the understanding that certain insulating materials exhibit a dielectric coefficient that changes with temperature. This necessarily also leads to a line capacitance that varies with temperature. This measuring arrangement is further based on the understanding that the transit time of a measurement signal is also significantly determined by the dielectric. The transit time is in fact proportional to the reciprocal of the square root of the dielectric coefficient. With increasing temperature, the dielectric coefficient increases, and the transit time of the measurement signal correspondingly falls.

This effect is now exploited by the measuring arrangement for temperature measurement. A conclusion is drawn here from a change in the signal transit time in comparison with an expected transit time or a reference transit time regarding a change in the electric coefficient. A reference transit time for a given cable length at room temperature is, for example, specified. It is now here preferable to conclude that there is a change in temperature if deviations from the expected transit time are detected in the region of 150 ps per 100 m length of cable.

To enable the easiest and most reliable possible evaluation of the measurement signal, the sensor cable contains the second signal line with an insulation of a second material that differs from the first material. The second material correspondingly also exhibits a second dielectric coefficient that differs from the first dielectric coefficient. In more detail, the injection unit is designed to inject the measurement signal in parallel into both signal lines, and the evaluation unit further is designed to evaluate a transit time difference for the measurement signal injected into the two signal lines. The second signal line therefore constitutes a kind of reference line in which the measurement signal propagates with a different signal speed as a result of the different choice of material. In the presence of a temperature change this leads to a change in the difference in transit time between the two signal lines; this is evaluated by the evaluation unit and converted into a corresponding temperature signal. To measure the transit time difference, and to ascertain the temperature from this, the evaluation unit appropriately contains an appropriate circuit or electronics. For the evaluation and conversion into the temperature signal, characteristic magnitudes for the two signal lines are, for example, stored in the evaluation unit or are generated by algorithms. A value of temperature change, or an absolute temperature value, is derived from a measured difference in transit times. The sensor cable in particular does not necessarily merely comprise the two signal lines, but expediently also further lines, cores or cables which are not, however, initially of significance to the measuring principle being applied. When in particular the sensor cable is used for additional functions, then it is appropriate for suitable further transmission elements to be integrated into it, or for a number of further cables to be grouped with the sensor cable into a cable harness or assembly.

To carry out a temperature measurement only at a specific location or a specific partial section along the sensor cable, that is to say for locally selective temperature measurement, the first signal line expediently only contains an insulation of the first material in certain sections, and otherwise has an insulation of the second material. This also refers in particular to an implementation such that the first material is initially applied to certain sections of the first signal line, after which an insulation of the second material is applied along the whole of the first signal line, i.e. also then to the section onto which the first material has already been applied. A corresponding sensor cable is initially particularly suitable as a temperature sensor, for example in an on-board electrical system of a vehicle, as part of a cable harness, or also at a specific component of the vehicle.

Alternatively or in addition, in an advantageous embodiment of the sensor cable, a cable cladding of the cable or a core cladding of a core of the cable contains an electrically conductive section extending along the sensor cable, which is the first signal line. In a preferred method, for example, an electrically conductive additive is added in a suitable manner for this purpose during fabrication of the cable cladding or core cladding, in order to form the electrically conductive section as a signal line. Alternatively, the cable cladding is manufactured in a strip extrusion method from two different materials. The remaining part of the cable cladding is then manufactured from the first material which correspondingly surrounds the signal line as insulation. Through the implementation of the temperature sensor as a cable, it has a particularly low dimension, in particular transversely to the longitudinal direction, and is therefore preferably used and installed at such locations where only a little space is available.

Such a cable-like temperature sensor finds an advantageous use in, for example, the exhaust system, in particular in the catalytic converter of a vehicle. The thermo couplers conventionally used here are usually expensive, in addition to which their measurement results are disadvantageously dependent on the temperature gradients that are present; due to its principle, these disadvantages are not exhibited by the cable-like temperature sensor.

To ensure that the sensor cable exhibits high sensitivity, the first material is preferably selected such that its dielectric coefficient changes by at least 1%, and preferably by at least 5%, for each 10° K of temperature difference.

Due to the correlation with the capacitance of the cable, the change in the dielectric coefficient is proportional to the capacitance change. The first material is therefore in general so selected that the capacitance changes by at least 1%, and preferably by at least 5%, for each 10° K. To measure the capacitance, the sensor cable is placed in a temperature-controlled water bath. With a capacitance measurement of this sort, a signal line with a PVC insulation has, for example, shown an increase in the capacitance of nearly 15% per 10° K. PVC is therefore preferably employed as the first material.

The two signal lines here expediently constitute a conductor pair twisted together, whereby a signal transmission that is as free as possible from interference is achieved as a result of the symmetry, and at the same time the most equal possible conductor lengths are achieved in the individual signal lines. A further advantage can be seen in that through the twisting of the two signal lines, they are equally exposed to a temperature that has to be measured. For further screening, the conductor pair are preferably surrounded by a screening layer and then by a common cable cladding. As an alternative it is also possible for the signal lines to be carried together with further data or power supply lines within a common protective or cable cladding, and potentially also within a common screen, preferably as a twisted conductor pair.

In order to achieve the largest possible difference in transit time between the two signal lines even at low temperature differences, the temperature dependencies of the dielectric coefficients of the two materials differ from one another preferably by at least the factor 2, and in particular by at least the factor 4 or even at least the factor 10. It is to be understood here that the mean percentage change in the dielectric coefficient of the one material when compared with the other material over a predetermined temperature interval of, for example, 10° K or even of 50° K changes more strongly by the quoted factor. Preferably the two dielectric coefficients differ already at room temperature by, for example, the factor of at least 1.3 or 1.5 when measured, for example, at 50 Hz. Expediently a material is chosen for the second material whose dielectric coefficient preferably exhibits little or hardly any temperature dependency. It is to be understood here that the dielectric coefficient changes, at least on average—for example over a temperature range from room temperature up to 80° C.—by less than 1% per 10° K. An insulating material whose dielectric coefficient has a low temperature dependency is in particular polypropylene. Investigations of capacitance, measured again in a water bath, have shown that the capacitance rises only by about 3.5% over the temperature range between 20° C. and 70° C., and therefore only a change of 0.7% per 10° K is present. PVC, with a change of about 15% per 10° K, therefore exhibits a temperature dependency greater by a factor of about 20.

According to an expedient embodiment, the sensor cable further contains at least one resistive line, preferably made of a resistive alloy, and the evaluation unit is further designed for evaluation of the resistance of the resistive line and for deriving a second temperature signal from that. The precision of the measurement can be increased through this resistive line. Resistive alloy here refers to a metal alloy which, in particular in comparison with a pure copper conductor, exhibits a significantly higher electrical resistance, for example by at least a factor of 10 or even 100. Resistive alloy refers in particular to an alloy or resistive wire in accordance with DIN 17471.

The electrical resistance of the resistive line also exhibits a temperature dependency, so that through the additional integration of the resistive line, a second, independent path to a temperature measurement is integrated into the sensor cable. Just as in the first path, so also in the second path, no discrete sensor elements are required, but, in a simple design, a physical property of the signal line itself is exploited. Due to the different physical temperature dependencies, namely on the one hand the dependency of the dielectric coefficient and on the other hand the temperature dependency of the electrical resistance of the resistive alloy, the two temperature signals obtained can thus be evaluated for the purposes of increased reliability and of redundant evaluation. Further, due to the different physical causes—on the one hand for the change in the transit time of the measurement signal and on the other hand for the change in the electrical resistance—additional information emerges that can be usefully evaluated.

Accordingly, the evaluation unit is also configured for comparing and evaluating the two temperature signals, and decides, in particular, whether only a local hotspot or an even heating of the sensor cable is present. Due to the different underlying principles affecting the signal, the signals change in different ways. Through a comparison of the change, the local hotspot can then be identified. An algorithm that appropriately evaluates the signals is in particular employed here for the comparison In an advantageous embodiment, the evaluation unit is configured to evaluate a transmitted signal component of the measurement signal. The injection unit and the evaluation unit are here, in particular, arranged at different ends of the sensor cable. The advantage of such a transmission measurement is found in particular in the fact that, due to the usually low absorption and reflection losses, the transmitted signal component exhibits a high signal strength in comparison thereto, and can thus be measured particularly easily and accurately. The temperature measurement is thus particularly robust.

In a suitable method for temperature measurement with the measuring arrangement, a transmission measurement is then in particular performed in such a way that the measurement signal is coupled in at one end of the sensor cable, and is received by the evaluation unit at the other end, which in particular contains an appropriate terminal for this purpose. The measurement signal here travels dependent on temperature at different speeds along the two signal lines as a result of the temperature-dependent first dielectric coefficient; the resulting transit time difference on arrival of the two parts of the measurement signal is then determined by the evaluation unit.

In order to ensure an appropriate time resolution in respect of the transit time difference, in particular during a transmission measurement, and to determine the difference in transit times with appropriate accuracy, in a preferred embodiment of the method a pulse counter is activated on arrival of the measurement signal at the evaluation unit along one of the two signal lines, and is deactivated upon arrival of the measurement signal along the other of the two signal lines, and the pulse counter is evaluated in order to determine the transit time difference. Such a pulse counting method is in particular suitable when applying the method in the on-board electrical system of a vehicle, in which, in particular, cable lengths of about 1 to 50 m are usual. These cable lengths lead in particular to time differences of about 0.8 to 40 ps, for which conventional measurement methods are unsuitable.

In the pulse counting method, the pulse counter is activated at the first arrival of the measurement signal along one of the two signal lines. This generates repeating counting pulses at equal time intervals, whose number is counted and stored until the second arrival of the measurement signal along the other signal line. The time resolution is here in particular determined by the frequency of the counting pulses which is correspondingly selected to be high, for example in the range from 100 MHz up to 10 GHz, and thus corresponds to a time interval of about 0.1 to 10 ps. The evaluation of the number of counting pulses that are counted then yields the time difference between the two paths of the measurement signal along the two signal lines, and accordingly the temperature of the sensor cable on the basis of the temperature-dependent first dielectric coefficient.

The measurement signal is preferably transmitted in the form of a pair of signals with mirror-symmetry, as is known in the motor vehicle field. In other words, one of the two signal components, each of which is coupled into one of the signal lines, is inverted with respect to the other signal component. An incorrect measurement resulting from interference along the sensor cable is in this way particularly efficiently avoided. The evaluation described above using a pulse counter with such a measurement signal is also possible in a particularly simple and economical manner by standardized semiconductor components. A suitably configured measuring arrangement is then advantageously economical to manufacture and can be installed in a space-saving manner in series production, in contrast to a comparably comprehensive and expensive laboratory construction for the implementation of a similar temperature measurement by means of pulse-domain or time-domain reflectometry (TDR). In order to achieve a reliable measurement, in particular with the short time differences mentioned above, the measurement signal, in particular when formed as rectangular signal, advantageously exhibits the greatest possible steepness. A sinusoidal measurement signal, which ensures particularly little interference from other signals due to an especially narrow frequency spectrum, is, however, also suitable.

In an expedient embodiment, the evaluation unit is, in addition or alternatively, configured to evaluate a reflected signal component of the measurement signal. Preferably a position of a local hotspot can be determined from the evaluation of the reflected signal component. The transit time of the reflected signal component, reflected at a reflection location that is created by a local change in impedance as a result of a locally limited change, caused by temperature, in the dielectric coefficient, is evaluated for this purpose.

This embodiment is based on the consideration that a merely local, and therefore non-homogeneous, variation in the dielectric coefficient results in an impedance step, whereby at least a component of the measurement signal is reflected at this changed impedance and thrown back. Here again a change in the signal transit time of a component of the measurement signal is finally evaluated. In this variant embodiment, the reference or comparison value would be an infinite signal transit time in the absence of an impedance step, in other words when no signal component is thrown back. Under normal conditions, that is when there is no local hotspot, the evaluation unit does not measure a reflected signal component. The local hotspot is thus located on the basis of the signal transit time.

Preferably it is in addition also provided that a temperature value is also ascertained through this reflection measurement. The magnitude of the temperature can be determined from the height of the reflection.

Expediently the evaluation of the reflected signal component is evaluated in addition to the change of the normal signal transit time of the unreflected measurement signal (i.e. a non-reflected component). Additional information about a local hotspot is obtained through this measure. Other than the measurement using the resistive line, this evaluation of the reflected signal component fundamentally allows the position of the local hotspot to be identified.

This reflective measurement is performed in accordance with the fundamentally known TDR principle. It is crucial in the present case that a variation in the dielectric coefficient resulting from a local hotspot is exploited. In its simplest embodiment, the sensor cable for this reflective measurement is configured as a single-core line with a dielectric, that is with an insulation of a first material. Even one such single-core line therefore defines a suitable sensor cable for the measuring arrangement, optionally for the reflective measurement or for the evaluation of the change of the signal transit time of the original, non-reflected measurement signal. Preferably a single-core line of this type operates in combination with a suitable embodiment of the evaluation unit, both for reflective measurement and for evaluation of the signal transit time of the non-reflected component of the measurement signal.

A sensor cable of this sort preferably contains, in addition to the first signal line, a further return line for the reflected signal component, and is implemented for example as an auxiliary line, wire or braid, or as a screen. In an alternative embodiment, the sensor cable is configured with two first signal lines, each with identical insulation of the same material, where the two signal lines are preferably twisted together in the manner of a twisted pair. The effect of the reflection, and thus the sensitivity of the measuring arrangement, is increased by this.

The particular advantage of the combination of the reflective measurement combined with the transit time measurement of the unreflected measurement signal is that, on the basis of the same physical effect, namely the temperature-dependent change in the dielectric coefficient, a temperature measurement and, at the same time, a position-dependent resolution of a local hotspot is permitted.

In a preferred variant, the measuring arrangement is configured for use in a vehicle on-board electrical system, and at least one of the two signal lines of the sensor cable creates an electrical connection between an energy source and a load, for the transmission of electrical power. At least one of the two signal lines thus performs a double function, in that by means of it on the one hand electrical power is transmitted for the purpose of energy supply, and on the other hand the measurement signal is transmitted for the purpose of temperature determination of the sensor cable. It is then possible in this way for the temperature of a power supply cable to be measured with a particularly compact construction.

In an appropriate further development, the sensor cable is a partial cable of a bundle of cables assembled into a cable harness, so that by means of the sensor cable the temperature of the entire cable harness is also measurable, in particular without having to install a temperature sensor with associated lines as an additional element.

The sensor cable then preferably connects an energy source that is arranged in the vehicle, such as for example a battery, a high-voltage store, or an alternator with a load, for example a sensor, a lighting apparatus, a power distributor or an electric drive machine. It is also, however, conceivable that the sensor cable in a suitable variant in an electric or hybrid vehicle connects a load or energy store of the vehicle to a socket that is connected to an energy source that is external with respect to the vehicle, in particular only temporarily. For example, the external energy source is a charging station, and an increase in temperature resulting from a charging current is then measurable by the sensor cable.

In the vehicle field in particular, the electric power transmitted by the sensor cable is usually implemented by a direct voltage or by an alternating voltage whose frequency is only low, for example 60 Hz at most. The measurement signal, in contrast, is in an expedient manner a comparatively high-frequency signal with a frequency of, for example, at least 1 kHz, whereby an interference from the energy transmission is avoided. The measurement signal is then, for example, a periodic rectangular signal, with a period that corresponds to the frequency and a suitably short duration, for example about 10 ps. It is in this way advantageously ensured that the frequency spectra of the measurement signal and of the power supply do not overlap, or only do so to a negligible extent, and thus do not influence one another.

For reversibly disconnecting the electrical connection established by the sensor cable by the evaluation unit, the measuring arrangement appropriately contains a cut-out which is driven by the evaluation unit depending on the temperature measurement. A safety mechanism for the electrical connection and, in particular, also for the load that is connected to it and the energy source, is advantageously realized through this. If the temperature varies from a certain predetermined set temperature, the cut-out is then expediently triggered and the connection is broken, so that no more electrical power is transmitted, and damage to the sensor cable, possibly to surrounding cables and possibly to connected components is prevented. The cut-out here is preferably an economical semiconductor cut-out in the form of an integrated circuit. Expediently the cut-out is integrated into the evaluation unit, whereby the arrangement as a whole is particularly compact.

Through the use of such a safety mechanism, the advantage also arises that the sensor cable can be made with a lower cross section than would otherwise be necessary for the electrical power to be transmitted due to the usual safety margins. Excessive loading is then not countered through corresponding dimensioning of the cross section, but by interrupting the connection in operation. Costs as well as weight and space are thus saved, which is particularly advantageous in vehicle construction.

In order in particular to realize continuous monitoring of the temperature of the sensor cable, the temperature measurement is preferably made in real time, for the ascertainment of an instantaneous temperature of the sensor cable. Such on-line measurement permits a particularly safe temperature monitoring in operation with potentially changing ambient conditions. This is particularly advantageous in the vehicle field, since here very different operating modes of the vehicle usually in general lead to continuously changing loading of the on-board electrical system, and of the sensor cable integrated into it in particular.

The embodiments of the measuring arrangement described above are, in particular in association with use in an on-board vehicle electrical system, not exclusively advantageous in the everyday operation of a series product, but also are advantageous with prototypes and during the development phase. Through the appropriate use of the measuring arrangement or of the sensor cable, particularly also in a multiple version, the actual loading of the on-board electrical system can be recorded and measured even during development, and an optimization, in particular in respect of cable routing and cross-section design, is easily possible on the basis of real temperature data, instead of using simulations and/or additional conventional sensors with their associated expense and requirement for space. The measuring arrangement and/or the sensor cable is therefore advantageously used, particularly with a vehicle, to support the design of an on-board electrical system. In an expedient development, the measurements carried out with a prototype are used with a series product as a reference or calibration measurement.

The advantageous use of the measuring arrangement in the automotive field, which in particular means with vehicles, described above refers in particular to their analogous use also in the industrial sector, for example with assembly lines, robots and similar machines, in other words generally with systems with a cable system, in particular one similar to an on-board electrical system, with corresponding advantages. In particular in the case of assembly plants and robots, the cable lengths used are of a similar order of magnitude to those of vehicles, so that any use in these cases is particularly suitable due to the simplified adaption. In a suitable variant the measuring arrangement is accordingly part of an assembly machine or of an assembly plant, and serves there advantageously for the temperature measurement at a cable or cable harness, and in particular also for monitoring and securing it.

The measuring arrangement and/or the sensor cable are also suitable in particular for use in a cable protection system and with a method for protecting a cable by such a cable protection system. The temperature of the cable is measured here, and when a predetermined switch-off temperature of the cable is reached, an electrical connection established by means of the cable is interrupted. The sensor cable contains two signal lines, each of which is surrounded by an insulation of different materials with different temperature-dependent dielectric coefficients. The two signal lines here are preferably twisted together, in particular to form a conductor pair.

A coaxial cable is, alternatively, used as a sensor cable. The outer conductor, that is the screen, is here employed as the second signal path. Generally, when a sensor cable is provided with a screen, this is expediently at the same time one of the two signal lines, whereby a particularly compact construction results for the sensor cable. In particular in association with the advantageous use of the sensor cable as a cable for the transmission of electrical power already explained, the two signal lines then both perform a double function. On the one hand, the power is transmitted by means of the one signal line, and the other signal line serves for screening, while the same signal lines are used for temperature measurement. In this embodiment, a temperature measurement is realized without an additional space requirement along the sensor cable; only components that are in any case present are used.

In a suitable development, the manufacture in particular of the sensor cable is simplified in that one of the two signal lines is incorporated into it as an auxiliary line. Auxiliary line refers here in particular to a line that is incorporated during manufacture of a cable as a screen or ground in addition to the other lines of the cable, and can correspondingly be connected at the ends. The auxiliary line is, for example, configured as a wire, braid, weave or tape, and is incorporated longitudinally or in the form of a helix. The auxiliary line then advantageously performs a double function, namely firstly the originally intended function as an auxiliary line, for example for grounding, as well as the additional function as a signal line.

In a preferred development, a further resistive line, consisting of a resistive alloy, is also integrated into the sensor cable. Expediently here two resistive lines are integrated, which, together with the two signal lines, preferably form a common stranded assembly, and in particular in the manner of a quadruple stranding, preferably being stranded together in the manner of a quadruple star. The two signal lines here form a first conductor pair, and the two resistive lines form a second conductor pair.

Other features which are considered as characteristic for the invention are set forth in the appended claims.

Although the invention is illustrated and described herein as embodied in a measuring arrangement and a temperature-measuring method, and sensor cable for such a measuring arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts with the same function are shown with the same reference signs in the figures.

Figure 1:
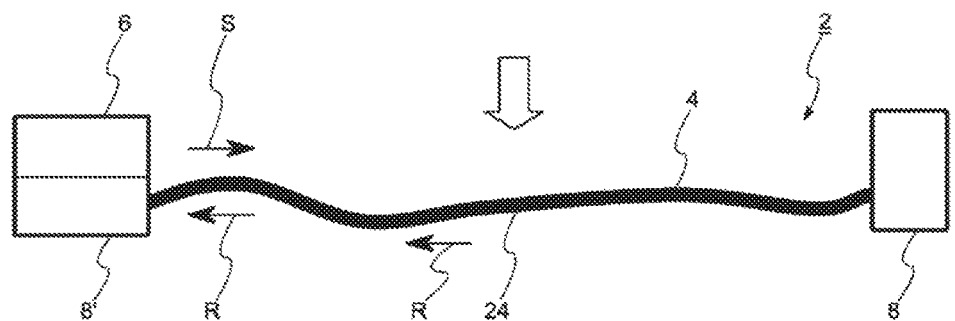
FIG. 1 is a simplified illustration of a measuring arrangement.

Referring now to the figures of the drawings in detail and first, particularly to FIG. 1 thereof, there is shown a measuring arrangement 2 for temperature measurement which contains a sensor cable 4, an injection unit 6 and an evaluation unit 8, 8'. The measuring arrangement 2 is used in general for temperature measurement either of a temperature change or also the measurement of an absolute temperature, preferably with local resolution in the region of the sensor cable 4. In the exemplary embodiment, a part 8' of the evaluation unit 8 is illustrated on the side of the injection unit 6, and is configured to detect a reflected signal component R.

A measurement signal S is injected by the injection unit 6 into the sensor cable 4 and ultimately, after passing along the sensor cable 4, is evaluated by the evaluation unit 8.

The measurement signal S is, for example, a digital signal, wherein signal pulses P (see also FIG. 2) are injected in defined periods of time.

Figure 2:
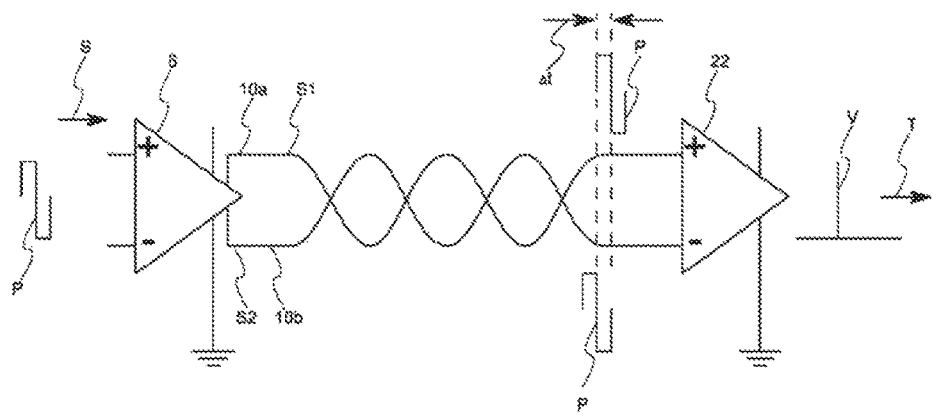
FIG. 2 is a simplified circuit diagram of the measuring arrangement.

FIG. 2 illustrates a variant embodiment in which the sensor cable 4 contains a first signal line 10a and a second signal line 10b, which are stranded together to form a conductor pair in the manner of a twisted pair and which are, for example, moreover surrounded by a screen and/or cable cladding.

Figure 3:
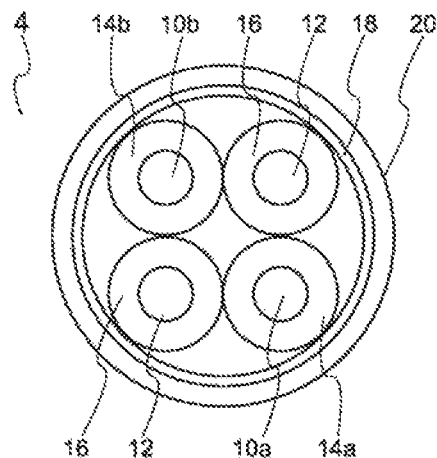
FIG. 3 is a diagrammatic, cross-sectional view of a sensor cable.

In addition to this conductor pair 10a, 10b, in an alternative variant embodiment, illustrated in FIG. 3, an additional second conductor pair with insulated resistive lines 12 is integrated into the sensor cable 4. The resistive lines 12 and the conductor pair 10a, 10b are stranded together in the manner of a quadruple stranding. The two signal lines 10a, 10b and the further resistive lines 12 are here arranged diagonally across from one another in the manner of a cross.

The signal lines 10a, 10b are surrounded by a first material 14a or by a second material 14b as an insulation or also as a dielectric, wherein the two materials 14a and 14b have different dielectric coefficients. The resistive lines 12 are also surrounded by an insulation 16. The entire stranded assembly, i.e. the signal lines 10a, 10b and the resistive lines 12, with the respective insulations 14a, 14b and 16 are surrounded by a common screen 18 and by a cable cladding 20 immediately surrounding that. The screen 18 can be a multi-layer screen 18 comprising, for example, a braided screen as well as further foil screens.

In the variant embodiment shown in FIG. 2, the measurement signal S is injected into both signal lines 10a, 10b in parallel, the signal propagating as the measurement signals S1, S2 in the two signal lines 10a, 10b. These continue along the sensor cable 4 until they reach the evaluation unit 8. This, for example, contains a comparator 22, with the aid of which transit time differences Δt between the two measurement signals S1, S2 are detected and processed to form a comparison signal V. This is then processed further, in a manner not presented here in more detail, in the evaluation unit 8 in order to generate, from the comparison signal V and from the transit time difference Δt that it represents, a temperature signal T which is output, for example, as a relative temperature change or also as an absolute temperature.

When using the sensor cable 4 illustrated in FIG. 3 with the two insulated resistive lines 12, then the measurement signal S is in addition coupled into these resistive lines 12 by the injection unit 6, and correspondingly evaluated by the evaluation unit 8. The correspondingly configured evaluation unit 8 therefore contains at least one, and, in the case of the sensor cable according to FIG. 3, two signal inputs for resistive lines 12 and two signal inputs for the two signal lines 10a, 10b. The resistance of the respective resistive line 12 is ascertained through a resistance measurement, and a temperature signal T is also derived from this ascertained resistance value.

Finally, yet another signal, namely the reflected signal R, is detected and evaluated by the evaluation unit 8'. Such a reflected signal component R of the measurement signal S occurs in the case of a local hotspot 24, as is illustrated by the arrow in FIG. 1. Local hotspot 24 here means that a significantly higher temperature is present at this location as compared to the rest of the sensor cable 4.

Figure 4:
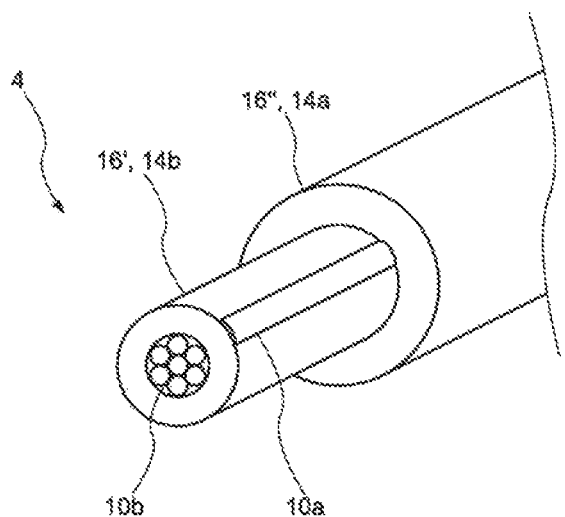
FIG. 4 is a perspective view of a variant of the sensor cable.

FIG. 4 shows a perspective illustration of a section of a variant of the sensor cable 4, wherein the second signal line 10b is implemented as a stranded conductor, and is surrounded by insulation 16 that is divided in a radial direction into two partial insulations 16', 16". The first signal line 10a is here arranged as a tape-like auxiliary line between the two partial insulations 16', 16", and is incorporated longitudinally. The two partial insulations 16', 16" are manufactured from the two different materials 14a, 14b, here in particular such that the inner partial insulation 16' is manufactured from the second material 14b and the outer partial insulation 16" is manufactured from the first material 14a with a temperature-dependent dielectric coefficient.

Figure 5:
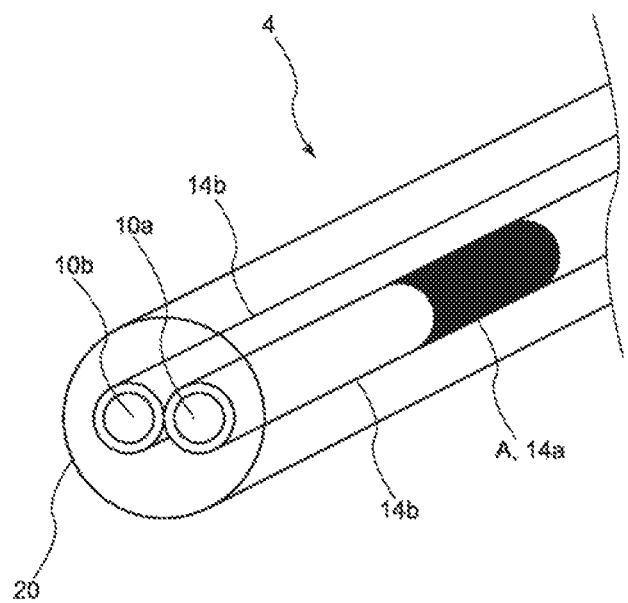
FIG. 5 is a perspective view of a further variant of the sensor cable.

FIG. 5 shows a section of a further variant of the sensor cable 4, also shown in perspective. In this variant, the insulation 16 of the first signal line 10a is only made of the first material 14a over a section A, and is otherwise made of the second material 14b, which is also used to make the insulation 16 of the second signal line. A local temperature sensor is constructed in this way, permitting locally selective temperature measurement. Both signal lines 10a, 10b are here additionally surrounded by a common cable cladding 20.

Figure 6:
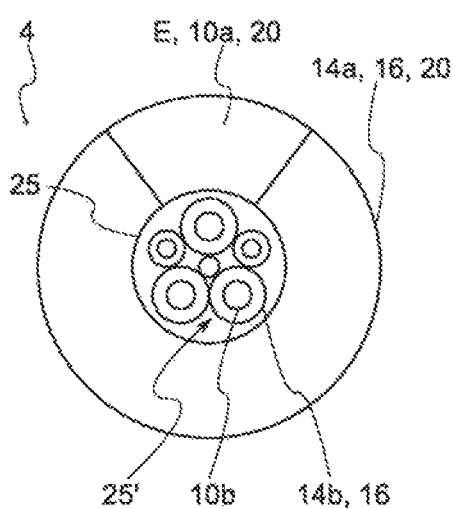
FIG. 6 is an end view of a further variant of the sensor cable.

A cross section of a further variant of the sensor cable 4 is illustrated in FIG. 6. The sensor cable 4 here contains a central line 25 with a plurality of cores 25'. One of these cores 25' here in turn comprises the second signal line 10b, which is manufactured of insulation 16 of the second material 14b. The line 25 is surrounded by a cable cladding 20 in which a part, having the form of an annular segment, is implemented as an electrically conductive section E. In the variant illustrated here, an electrically conductive additive is added in a suitable manner for this purpose during fabrication of the cable cladding 20, in order to form the electrically conductive section E as the first signal line 10a. Alternatively, the outer cladding 20 is manufactured for this purpose in a strip extrusion method from two different materials. The remaining part of the cable cladding 20 is then manufactured from the first material 14a which correspondingly surrounds the first signal line 10a as insulation 16.

The following different measurements and evaluations are altogether enabled with the measuring arrangement 2, and preferably are indeed carried out.

a) Measurement and evaluation of a change in the signal transit time in the first single line 10a as a result of a temperature increase: the first signal line 10a is here surrounded by the first material 14a as a dielectric that exhibits a strong temperature dependency. In particular, the first material 14a is formed by a PVC cladding. The second signal line 10b, which is designed as something like a reference line, is not necessarily required. The change in the signal transit time can also be ascertained absolutely in comparison to an expected value. The evaluation unit 8 and the injection unit 6 are for this purpose synchronized to one another in respect of the injection of the measurement signal S, so that the evaluation unit 8 can ascertain differences in the signal transit time in comparison with an expected signal transit time.

b) Ascertaining the transit time difference Δt between the measurement signals S1, S2 using a sensor cable 4 with the first signal line 10a and the second signal line 10b.

With this measurement setup according to FIG. 2, a simplified measurement through forming a difference of the two signals S1, S2 is permitted, whereby overall an improved reliability and greater precision are achieved.

In both cases a), b) a temperature change is determined from the changed signal transit time. A clear distinction between a homogeneous temperature increase along the entire sensor cable 4 and a merely local hotspot 24 is not, however, enabled here. The two variants a), b) are both based on a change in the dielectric coefficient in the presence of a temperature change.

c) Detection and evaluation of the reflected signal component R resulting from a local hotspot 24.

In the event of a local hotspot 24 this, as already explained, leads to a rise in the impedance, so that a reflected signal component R is obtained at this hotspot 24. This is coupled, for example, into the screen 18 in the case of the sensor cable 4 according to FIG. 3, and in this case therefore is employed as something like a return line. The evaluation unit 8' has, for this purpose, a further return line connection to which, in this case, the screen 18 is connected. The evaluation unit 8' checks whether there is a signal present at this return line connection, and then identifies it as the reflected signal component R. The evaluation unit 8 ascertains a signal transit time, namely that between the injection of the measurement signal S and the detection of the reflected signal component R. The evaluation unit 8' then derives the position of the local hotspot 24 on the basis of the signal transit time for the reflected signal component R. The section 8' of the evaluation unit 8 does not necessarily have to be separated from the evaluation unit 8. The injection unit 6 and the evaluation unit 8, 8' can, in principle, also be positioned in one device at one location. The sensor cable 4 is, for example, in this case laid in the manner of a loop.

d) Supplementary temperature measurement with the aid of the resistive line 12.

The measurement signal S is, in addition, also injected into the resistive line 12, and the evaluation unit 8 ascertains the resistance value of the resistive line 12, which is also temperature-dependent.

Through different combinations of these different measuring principles a) to d) it is possible to obtain different information.

With the measuring principles according to a), b) it is possible to draw conclusions as to a mean relative change in temperature or also as to a mean absolute temperature of the sensor cable 4.

Measurement principle b) allows the position of a local hotspot 24 to be located with local resolution.

Through combinations of measuring principles a)/b) and c) a measurement of temperature with simultaneous local resolution is enabled.

Measurement principle d) makes a second, independent measurement path available for ascertaining an averaged temperature change, or also of an averaged absolute temperature in the area of the sensor cable.

Through combinations of principles a)/b) and d) it is furthermore possible to distinguish whether the temperature rise is a result of only a local hotspot 24 or of a homogeneous heating of the sensor cable 4.

With a combination of all three fundamental measurement principles a)/b), c) and d) it is possible to determine whether just a local hotspot 24 is present and, in addition, its spatial location can be identified.

Altogether, therefore, the measuring arrangement 2 described here permits an economical and very effective measuring arrangement 2 for temperature measurement with the aid of a sensor cable 4 of comparatively simple design.

This measuring arrangement 2 is employed, in accordance with a first variant embodiment, for monitoring the temperature of cables. For this purpose the sensor cable, at least the individually insulated lines 10a, 10b and, in relevant cases, the resistive lines 12, are integrated together with further supply lines, data lines or even fluid lines and so forth, in a common protective sheath. Through this measure, therefore, a cable can be monitored for an unacceptable temperature stress, even if local. Further this measuring arrangement 2 is preferably employed in power engineering in order, for example, to identify defects, in particular in high-voltage cables, which lead locally to an increased line temperature. In addition to this, the measuring arrangement is generally also employed in process engineering for the temperature monitoring of machines, components etc., in order, for example, also to detect and measure temperature stratifications. On top of this, this measuring arrangement 2 is also preferably used in printed circuit board technology for temperature monitoring. The sensor cable 4 is as a whole characterized in that a temperature-sensitive sensor is formed over the entire length, and that separate individual sensors are not built into the cable.

Figure 7:
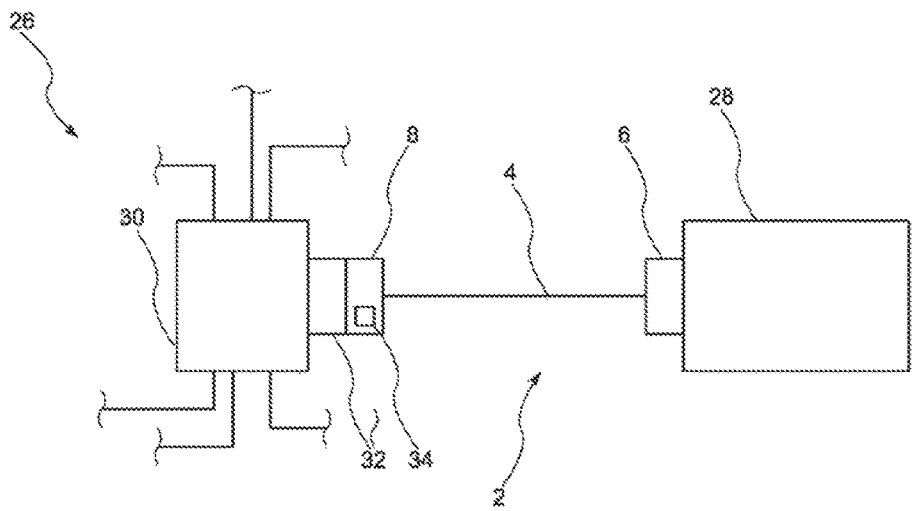
FIG. 7 is a block diagram of an on-board electrical system into which the measuring arrangement is integrated.

FIG. 7 shows schematically a section of an on-board electrical system 26 of a vehicle, not itself illustrated further. A measuring arrangement 2 is integrated into the on-board electrical system 26, in order to implement a cable protection system. Initially a sensor cable 4 is employed for the transmission of electrical power from an energy source 28 to a load 30. The transmission is performed, in particular, by at least one of the two signal lines 10a, 10b. In the exemplary application shown here, the energy source 28 is a high-voltage store of the vehicle, for the supply of an electrical drive machine; the vehicle is thus, in particular, an electric or hybrid vehicle. The load 30 here is a power distributor, which distributes the electrical power provided by the energy source to further loads, not illustrated in more detail.

In order, in particular, to protect the electrical connection from overheating, the measuring arrangement 2 contains a cut-out 32, by which the connection can be interrupted. Such an interruption occurs, for example, if a certain temperature rise is measured in or at the sensor cable 4. The measuring arrangement 2 is here configured for temperature measurement by means of the transmission method in order to measure and monitor the temperature; the injection unit 6 and the evaluation unit 8 are arranged for this purpose at different ends of the sensor cable 4.

The injection unit 6 then generates the measurement signal S which is transmitted by the two signal lines 10, 10b. Depending on the temperature along the sensor cable 4, a transit time difference Δt develops during the propagation between the two parts; this is measured by the evaluation unit 8 by a pulse-counting method, and used to ascertain the temperature. For this purpose the evaluation unit 8 contains an appropriate pulse counter 34. If the temperature exceeds a predetermined switch-off temperature, for example as a result of a particularly high current, the cut-out 32 is triggered, and the connection established by the sensor cable 4 is interrupted, in order to prevent damage to the sensor cable 4 as well, in particular, as to its surroundings through further heating.

The following is a summary list of reference numerals and the corresponding structure used in the above description of the invention:

2 Measuring arrangement
4 Sensor cable
6 Injection unit
8, 8' Evaluation unit
10a First signal line
10b Second signal line
12 Resistive line
14a First material
14b Second material
16 Insulation
16', 16" Partial insulation
18 Screen
20 Cable cladding
22 Comparator
24 Hotspot
25 Line
26 On-board electrical system
28 Energy source
30 Load
32 Cut-out
34 Pulse counter
A Section
E Electrically conductive section
S Measurement signal
P Pulse
Δt Transit time difference
V Comparison signal
T Temperature signal
R Reflected signal component
S1 Measurement signal in the first signal line
S2 Measurement signal in the second signal line

The invention claimed is:

1. A measuring configuration for temperature measurement, the measuring configuration comprising:
a sensor cable having a first signal line and a second signal line, said first and second signal lines each being surrounded by an insulation, said insulation of said first signal line being made of a first material with a first temperature-dependent dielectric coefficient, said insulation of said second signal line being made of a second material being different from the first material and having a second temperature-dependent dielectric coefficient being different from the first temperature-dependent dielectric coefficient;
a signal injector injecting a measurement signal into said sensor cable, said signal injector configured for a parallel injection of the measurement signal into said first and second signal lines; and
an evaluator configured for evaluating a difference between a first transit time of the measurement signal injected into said first signal line and received at said evaluator and a second transit time of the measurement signal injected into said second signal line and received by said evaluator, and a temperature is derived from the difference between the first transit time and the second transit time, the first and second transient time being defined as a time necessary for the measurement signal to travel from the signal injector to the evaluator.

2. The measuring configuration according to claim 1, wherein said first signal line only contains said insulation of the first material in certain sections, and otherwise has said insulation of the second material for locally selective temperature measurement.

3. The measuring configuration according to claim 1, wherein the first material is selected such that the temperature-dependent, first dielectric coefficient changes by at least 1% for each 10° K of temperature difference.

4. The measuring configuration according to claim 1, wherein the first temperature-dependent dielectric coefficient demonstrates a temperature dependency that is greater than the second dielectric coefficient by at least a factor 2.

5. The measuring configuration according to claim 1, wherein:
said sensor cable further has at least one resistive line made of a resistive alloy; and
said evaluator is configured for evaluating a resistance of said resistive line and for deriving a further temperature from the resistance.

6. The measuring configuration according to claim 5, wherein said evaluator is configured for comparing and evaluating the temperature and the further temperature, and deciding, whether only a local hotspot or an even heating of said sensor cable is present.

7. The measuring configuration according to claim 1, wherein said evaluator is configured to evaluate a position of a local hotspot on said sensor cable, in that a transit time of a reflected signal component, reflected at a reflection location that is created by a local change in impedance as a result of a locally limited change, caused by temperature, in the dielectric coefficient, is evaluated.

8. The measuring configuration according to claim 1, further comprising an energy source; and
wherein the measuring configuration is configured for use in an on-board electrical system of a vehicle, and in that at least one of said first and second signal lines of said sensor cable creates an electrical connection between said energy source and a load, for a transmission of electrical power.

9. The measuring configuration according to claim 1, further comprising a cut-out for reversibly disconnecting an electrical connection established by said sensor cable by means of said evaluator, wherein said cut-out is driven depending on the temperature measurement and is connected in at one end of said sensor cable.

10. The measuring configuration according to claim 1, wherein the temperature measurement is made continuously by means of said evaluator.

11. The measuring configuration according to claim 1, wherein the temperature measurement is made in real time, for ascertainment of an instantaneous temperature of said sensor cable.

12. The measuring configuration according to claim 1, wherein the temperature is a temperature of said sensor cable.

13. A method for temperature measurement, which comprises the steps of:
providing a sensor cable having a first signal line and a second signal line, the first and second signal lines each being surrounded by an insulation, the insulation of the first signal line being made of a first material with a first temperature-dependent dielectric coefficient, the insulation of the second signal line being made of a second material being different from the first material and having a second temperature-dependent dielectric coefficient being different from the first temperature-dependent dielectric coefficient;
injecting, via a signal injector, a signal into the sensor cable, the signal injector parallel injecting the signal into the first and second signal lines;
receiving the signal at an evaluator being connected to the first and second signal lines, the evaluator determining first and second transient times being defined as a time necessary for the signal to travel from the signal injector to the evaluator;

determining, via the evaluator, a difference between the first transit time of the signal injected into the first signal line and received at the evaluator and the second transit time of the signal injected into the second signal line and received by the evaluator; and deriving a temperature of the sensor cable from the difference between the first transit time and the second transit time.

14. The method according to claim 13, which further comprises:

activating a pulse counter, being part of the evaluator, on arrival of the signal at the evaluator along one of the first and second signal lines;

deactivating the pulse counter upon arrival of the signal along the other of the first and second two signal lines; and evaluating the pulse counter for determining a transit time difference.

15. The method according to claim 13, which further comprises:

interrupting an electrical connection established by means of the sensor cable when a predetermined switch-off temperature of the sensor cable is reached, wherein the measuring configuration serves as a cable protection system.

* * * * *